United States Patent
Schötz et al.

(10) Patent No.: US 7,716,952 B2
(45) Date of Patent: May 18, 2010

(54) METHOD FOR THE PRODUCTION OF A BLANK MOLD FOR OPTICAL FIBERS

(75) Inventors: Gerhard Schötz, Aschaffenburg (DE); Karsten Bräuer, Bruchköbel, DE (US); Heinz Fabian, Grossostheim (DE); Norbert Treber, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1216 days.

(21) Appl. No.: 10/552,539

(22) PCT Filed: Apr. 6, 2004

(86) PCT No.: PCT/EP2004/003665

§ 371 (c)(1), (2), (4) Date: Oct. 11, 2005

(87) PCT Pub. No.: WO2004/089837

PCT Pub. Date: Oct. 21, 2004

(65) Prior Publication Data

US 2006/0213228 A1    Sep. 28, 2006

(30) Foreign Application Priority Data

Apr. 9, 2003    (DE) .............................. 103 16 487.1

(51) Int. Cl.
- C03B 37/075 (2006.01)
- C03B 37/07 (2006.01)
- C03B 37/018 (2006.01)
- C03C 13/00 (2006.01)
- C03C 25/00 (2006.01)
- G02B 6/00 (2006.01)
- G01N 23/00 (2006.01)

(52) U.S. Cl. .............................. 65/397; 65/382; 65/391; 65/378; 65/413

(58) Field of Classification Search ................... 65/397, 65/382, 391, 378, 413

See application file for complete search history.

(56) References Cited

U.S. PATENT DOCUMENTS 4,049,413 A * 9/1977 French ......................... 65/392

(Continued)

FOREIGN PATENT DOCUMENTS

DE     25 36 457 A1    2/1977

(Continued)

OTHER PUBLICATIONS

"luminous intensity."Encyclopædia Britannica. 2009. Encyclopædia Britannica Online. Apr. 7, 2009 <http://www.britannica.com/EBchecked/topic/351262/luminous-intensity>.*

(Continued)

*Primary Examiner*—Khanh Nguyen
*Assistant Examiner*—Matthew Hoover
(74) *Attorney, Agent, or Firm*—Tiajoloff and Kelly LLP

(57) ABSTRACT

In a known method for the production of a blank mold for optical fibers, a fluorine-doped $SiO_2$ enveloping glass is produced on a core glass cylinder that rotates about its longitudinal axis, wherein a silicon-containing starting substance is fed to a plasma burner, said substance is then oxidized in a plasma flame assigned to the plasma burner to obtain $SiO_2$ particles, the $SiO_2$ particles are deposited by layers on the enveloping surface of the cylinder of the core glass cylinder in the presence of fluorine and sintered into the enveloping glass. The invention aims at providing an economical method, which builds upon the above-mentioned method, in order to produce a blank mold from which optical multi-mode fibers (52) can be obtained. In comparison with fibers (51) produced according to standard methods, said optical multi-mode fibers are characterized by high initial transmission in the UV wavelength range and good resistance with respect to brief UV radiation, more particularly in the 210-300 nm wavelength range. According to the invention, a plasma flame that irradiates an ultraviolet light having a wavelength of 214 nm with an intensity of at least 0.9 ?W—determined on the basis of plasma flame intensity measurement—is used for the formation and deposition of the $SiO_2$ particles on the core glass.

11 Claims, 2 Drawing Sheets

U.S. PATENT DOCUMENTS

Figure 1:
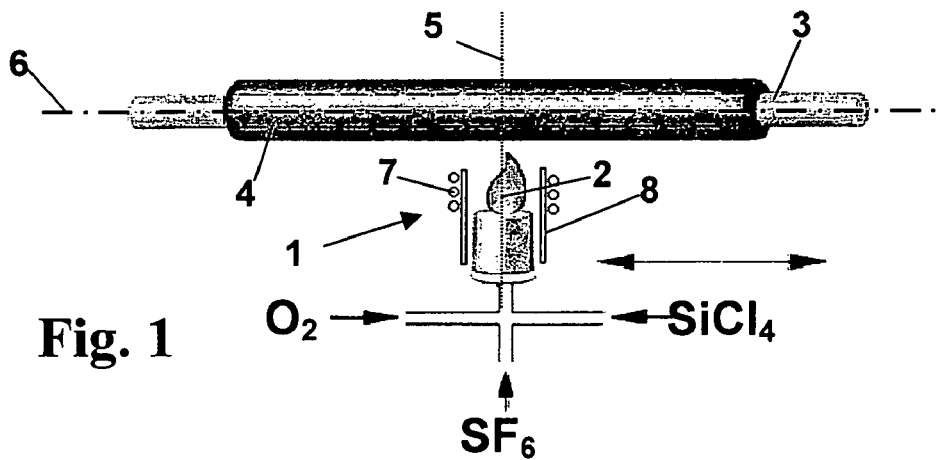

| | | | |
|---|---|---|---|
| 4,062,665 A * | 12/1977 | Izawa et al. | 65/391 |
| 4,162,908 A * | 7/1979 | Rau et al. | 65/60.53 |
| 4,221,825 A * | 9/1980 | Guerder et al. | 427/452 |
| 4,243,298 A * | 1/1981 | Kao et al. | 385/128 |
| 4,345,928 A * | 8/1982 | Kawachi et al. | 65/412 |
| 4,402,720 A * | 9/1983 | Edahiro et al. | 65/391 |
| 5,168,541 A * | 12/1992 | Booth | 385/129 |
| 5,474,589 A * | 12/1995 | Ohga et al. | 65/397 |
| 6,253,580 B1 | 7/2001 | Danilov et al. | |

FOREIGN PATENT DOCUMENTS

| | | |
|---|---|---|
| JP | 63 222035 A | 9/1988 |
| JP | 63 248733 A | 10/1988 |
| JP | 6 321553 A | 11/1994 |
| WO | WO 99/52832 A | 10/1999 |

OTHER PUBLICATIONS

Patent Abstracts of Japan, vol. 1995, No. 02, Mar. 31, 1995, for JP 6 321553 A.

Patent Abstracts of Japan, vol. 0130, No. 56 (C-566), Feb. 8, 1989, for JP 63 248733 A.

Patent Abstracts of Japan, vol. 0130, No. 15 (C-559), Jan. 13, 1989, for JP 63 2222035 A.

Biryukov, A.S. "Use of a Microwave Discharge at Atmospheric Pressure . . . ". Soviet Technical Physics Letters, American Institute of Physics, vol. 17, No. 3, Mar. 1991.

* cited by examiner

METHOD FOR THE PRODUCTION OF A BLANK MOLD FOR OPTICAL FIBERS

The present invention relates to a method for producing a preform for optical fibers by producing a fluorine-doped $SiO_2$ cladding glass layer on a core glass cylinder rotating about its longitudinal axis in that a plasma burner is fed with a silicon-containing starter substance, said substance is oxidized in a plasma flame assigned to the plasma burner to obtain $SiO_2$ particles and the $SiO_2$ particles are deposited in layers on the cylindrical outer surface of the core glass cylinder in the presence of fluorine and are sintered into the cladding glass.

Such a method for producing a preform for optical fibers, as well as a generic preform, are described in DE 25 36 457 A1. For producing the preform a core glass cylinder of undoped quartz glass is provided, and fluorine-doped quartz glass is deposited on the cylindrical outer surface thereof as a cladding glass layer. For producing a cladding glass layer an induction-coupled plasma burner is used and fed with a gas stream containing a hydrogen-free silicon compound and oxygen. Moreover, a fluorine-containing compound is introduced into the plasma flame assigned to the plasma burner. Fluorine-containing $SiO_2$ particles are formed from the starter substances in the plasma flame. These are deposited in layers onto the core glass cylinder rotating about its longitudinal axis and are directly sintered onto the core glass layer with formation of a fluorine-containing $SiO_2$ cladding glass layer.

The described method for producing a preform for optical fibers is also called "POD (plasma outside deposition) method". The core glass cylinder is normally produced by oxidation or by flame hydrolysis of silicon-containing starter substances by means of methods which are generally known under the names VAD (vapor phase axial deposition) method, OVD (outside vapor phase deposition) method, MCVD (modified chemical vapor deposition) method and PCVD or also PECVD (plasma enhanced chemical vapor deposition) method. The core glass cylinder consists of undoped quartz glass most of the time, but may also contain dopants that change the refractive index.

The present invention also refers to a method for producing a preform for optical fibers by providing a cladding glass tube of fluorine-doped quartz glass for over-cladding a core glass, with a silicon-containing starter substance being supplied to a plasma burner for producing the cladding glass tube, said substance being oxidized in a plasma flame assigned to the plasma burner to obtain $SiO_2$ particles and the $SiO_2$ particles being deposited in layers in the presence of fluorine on the cylindrical outer surface of a substrate tube of quartz glass rotating about its longitudinal axis, and said particles being sintered.

Such a method is described in U.S. Pat. No. 6,253,580 B1. For producing a cladding glass tube of fluorine-doped quartz glass according to the POD method, a dry plasma flame is produced in which $SiCl_4$ is oxidized into $SiO_2$ particles, and said particles are deposited and immediately vitrified on a substrate tube. A cladding glass tube of fluorine-doped quartz glass is obtained by introducing fluorine into the plasma flame. The substrate tube consists of doped or undoped quartz glass. The resulting cladding glass tube is used as a cladding material for a core glass for producing a preform for optical fibers.

Optical fibers are obtained by elongating the preform in a drawing method. They are inter alia used for the transmission of high-energy ultraviolet radiation, for instance for spectroscopic, medicinal or photolithographic applications for producing semiconductor components. The corresponding apparatus and machines are often equipped with excimer lasers emitting high-energy pulsed laser radiation of a wavelength of 248 nm (KrF laser) or of 193 nm (ArF laser).

Short-wave UV radiation in the wavelength range between 190 nm and 250 nm may create absorption-causing defects in the quartz glass of the fibers. Various damage mechanisms and their progress have been described. The quartz glass fibers often show a gradual decrease in transmission at the beginning of irradiation. The transmission decreases to a "plateau value" from which it hardly changes even during prolonged irradiation. This effect is called "photodegradation". The extent of defect formation and photodegradation depends on the quality of the respective quartz glass, the quality being essentially defined by structural properties such as density, refractive index profile, homogeneity and chemical composition. An important parameter is here the number of so-called "precursor centers". These are understood as defects that exist in the quartz glass matrix of the preform or the fiber already at the beginning and lead to a rise in absorption during continued UV irradiation (induced absorption). It has been found that in the known method, presumably due to the UV portion of the plasma flame, an induced absorption is created in the UV wavelength range that may lead to a low initial transmission of the optical fiber, and that "precursor centers" are also produced in large numbers in the core glass cylinder during deposition of the cladding glass layer, such centers leading to an intensified photodegradation in the fiber. Therefore, the preforms produced according to the known method often lead to an unfavorable behavior of the fibers drawn therefrom with respect to short-wave UV radiation.

It is the object of the present invention to provide an economic method for producing a preform from which fibers can be obtained having a high initial transmission in the UV wavelength range and a high resistance to short-wave UV radiation.

Starting from the above-mentioned method this object is achieved according to the invention in that a plasma flame which emits ultraviolet light of a wavelength of 214 nm with an intensity of at least 0.9 µW, determined on the basis of the plasma flame intensity measurement, is used for forming and depositing the $SiO_2$ particles on the core glass cylinder.

In a first variant of the method according to the invention, a plasma flame is produced for forming and depositing the $SiO_2$ particles on the core glass cylinder, the plasma flame emitting a minimum intensity of ultraviolet radiation of 0.9 µW at the wavelength of 214 nm. A suitable method for measuring the plasma flame intensity in the ultraviolet wavelength range has not been described yet in the technical literature. To be able to quantitatively determine the UV radiation emitted by the plasma flame, a method was therefore developed whose measuring set-up and measuring conditions will be explained further below with reference to FIG. 3. This measuring method will also be called PFI (plasma flame intensity measurement) method in the following.

As expected, it was found on the basis of such plasma flame intensity measurements that the emitted UV intensity increases with the electrical power fed into the plasma. In the former POD methods, the intensity of the UV radiation of said wavelength was normally about 0.8 µW. It was found that an increase in the intensity of shortwave UV radiation of the plasma flame yields preforms from which optical fibers are drawn that are characterized by a higher initial transmission in the UV range and a better damage behavior in comparison with high-energy UV radiation.

One possible explanation for this surprising effect is that due to the high UV intensity at the wavelength of 214 nm a defect formation is started that decreases from the surface of the core glass cylinder to the inside. The defects concerned are defects producing absorption in the UV range (induced absorption), and also "precursor defects". These defects, in turn, cause an absorption having a maximum which is also in the range of the wavelength of 214 nm, said absorption being particularly efficient in the near-surface region. The "intrinsic absorption" of the core glass cylinder produced in this way therefore reduces the further action of high-energy UV light of the plasma flame, so that the penetration of the damaging UV radiation into central layers of the core glass cylinder where the formation of defects and precursor defects is particularly critical is reduced. It is important that the core glass cylinder is shielded by this "intrinsic absorption" particularly of UV radiation of the wavelength range between 190 nm and 240 nm, for this radiation is decisive for the initiation of defects with UV absorption bands and their precursor defects in the core glass cylinder. UV radiation with a wavelength of less than about 190 nm is mainly kept away from the core glass cylinder by the air or intrinsic absorption of the plasma flame, while the UV radiation portion of the plasma flame of a comparatively long-wave range above 240 nm does not produce any significant defects in the quartz glass.

Hence, in the method of the invention the further action of harmful UV radiation of the plasma flame on the core glass cylinder is reduced by the rapid generation of UV-radiation absorbing defects. Hence, in the final analysis the damage caused by the great intensity of the plasma flame on the surface of the core glass cylinder does not effect an increase, but surprisingly a decrease in the mean effective damage dose per volume of core glass cylinder material in comparison with the prior-art procedure. The phase of the deposition process is here decisive in which no cladding glass layer or only a thin one is present on the core glass cylinder. In a later phase of the deposition process, the UV intensity of the plasma flame can also be reduced again. The plasma is produced by means of high-frequency alternating current. The UV intensity of the plasma flame at the wavelength 214 nm is determined by the electrical power introduced into the plasma. The higher this power, the greater is in general the UV intensity of the plasma flame, unless counteracting measures are taken, such as the introduction of UV-absorbing gas into the plasma flame. The method of the invention has turned out to be particularly advantageous in preforms from which optical fibers are produced that are intended to be used in combination with ultraviolet light of a short wavelength. The preform produced in this way shows a comparatively small number of defects and precursor defects in the center, so that both a high initial transmission in the UV range and a low induced attenuation are observed in the use of a fiber obtained from a preform produced according to the invention in combination with excimer radiation of 248 nm and 193 nm.

This result was found for a specific distance range between the surface of the developing preform (core glass cylinder and cladding glass deposited thereon) and the plasma flame. It is assumed that said distance has little influence on the defect-producing effect of the UV radiation, so that similar or slightly deviating results might be obtained at other distances. The plasma flame is produced inside a reaction sleeve which is surrounded by a high-frequency coil. This coil defines the excitation range for the plasma when the visible region of the plasma flame can also project beyond the end of the high-frequency coil. For definitely indicating the distance between the surface of the developing preform and the plasma flame the end of the high-frequency coil which faces the preform is defined as the place of the plasma flame. Measured from said place, this yields the distance range set in practice between the surface of the developing preform and the plasma flame between 60 mm and 90 mm.

In a preferred procedure, a plasma flame is used that emits light of a wavelength of 214 nm with an intensity in the range of 1.0 µW to 1.4 µW.

UV radiation of 214 nm above the indicated lower intensity limit effects a particularly rapid formation of the UV-radiation absorbing damage which reduces the further action of the UV radiation of the plasma flame and the accompanying defect formation in the center of the core glass cylinder. With an intensity above the said upper limit, the extent of the damage caused in the edge portion outweighs the absorbing and shielding effect thereof.

It has also turned out to be advantageous to keep the cylindrical outer surface of the core glass cylinder during deposition of $SiO_2$ at a surface temperature ranging from 1550° C. to 2000° C., preferably from 1700° C. to 1900° C., with the proviso that the core glass cylinder has an outer diameter of at least 40 mm, preferably of at least 60 mm.

In the deposition process, the core glass cylinder is heated up, which has the effect that diffusion processes take place more rapidly. As a result, impurities may e.g. pass into the center of the core glass cylinder more easily, or predetermined concentration profiles of a dopant distribution may be impaired. It is therefore desirable to keep the heating up of the core glass cylinder during deposition as small as possible. On the other hand, a certain heating up is indispensable for depositing and sintering the cladding glass layer. The temperature increases from the cylindrical outer surface of the core glass cylinder towards the inside. Thus, a lower temperature prevails in the interior of the core glass cylinder than in the area of the cylindrical outer surface. When a core glass cylinder is used having an outer diameter of at least 40 mm, preferably at least 60 mm, and in combination with the said surface temperature which is measured at the point of impingement of the plasma flame on the surface of the core glass cylinder (or at the point of impingement of the extension of the main propagation direction of the plasma flame towards the surface), a temperature evidently prevails in the center of the core glass cylinder that is so low that diffusion processes are hardly noticed. This improves the purity and reproducibility of the fiber properties and the values set for the refractive index profile and the attenuation characteristics of the core glass cylinder can be observed more easily.

With respect to a high transmission it has further turned out to be of advantage when the $SiO_2$ particles are deposited on the cylindrical outer surface in layers at a layer thickness in such a manner that they yield layers with thicknesses of not more than 0.05 µm in the optical fiber.

In dependence upon the draw ratio between preform and fiber, the formation of thin layers on the cylindrical outer surface has the effect that said layers are present in the optical fiber drawn from the preform in layers having thicknesses of less than 0.05 µm. Said layer thickness is clearly below the wavelength of the light guided in the fiber, whereby interactions between the individual layers and the light are avoided. By contrast, layers of a greater thickness which in the optical fiber lead to layers having a thickness of more than 0.1 and are thus in the order of the wavelength of the light guided therein impair optical transmission. The core diameter of a typical multimode fiber is 200 µm. When a core glass cylinder is used having an outer diameter of 70 mm, this yields a draw ratio of 350, so that in this example advantageous layer thicknesses of the cladding glass layer are less than 15 µm according to the invention.

Starting from the method described at the outside and used for producing a preform using a cladding glass tube, the above-indicated object is also achieved according to the invention in that the cladding glass tube is collapsed onto the core glass cylinder and that the substrate tube is removed prior to collapsing.

In this variant of the method according to the invention, it is not the core glass cylinder that is used as a carrier for the POD method, but a substrate tube of quartz glass is employed. Due to the UV portion of the plasma flame in the deposition process, defects are bound to be formed in the quartz glass matrix of the substrate tube, as has been explained above.

However, since the substrate tube is removed prior to collapsing of the cladding glass tube, the damage to the substrate tube has no effect on the core glass of the preform and the fiber obtained therefrom. Thus, in this variant of the method the core glass cylinder remains entirely unaffected by the UV radiation of the plasma flame.

The UV-absorbing defects and the precursor defects produced in the cladding glass due to the production process have only little influence on the attenuation and the radiation resistance of the fiber because, on the one hand, fluorine doping reduces defect formation and, on the other hand, the intensity guided in the cladding glass is low in a multimode fiber having a typical numerical aperture (NA) of 0.22 and a core diameter of 200 µm. The resulting multimode fibers are characterized by low absorption at a wavelength of 214 nm, which is distinctly less than 1 db/m, as a rule even less than 0.7 db/m.

The substrate tube can be removed mechanically (by grinding, polishing, drilling) or chemically (by etching). The last-mentioned procedure has turned out to be particularly suited.

Since the substrate tube is removed by etching, impurities created by mechanical tools or abrasives are prevented from penetrating into the cladding glass layer deposited on the substrate tube.

After completion of the POD method the substrate tube can be removed. However, it has turned out to be particularly advantageous when the substrate tube is etched off during formation of the cladding glass tube by introducing an etching gas into the inner bore thereof.

The etching off of the substrate tube in the POD method shortens the process time on the whole, as compared with etching at a later time, whereby the process costs are reduced and undesired diffusion of fluorine due to a hot process is diminished. At the same time, the etching gas may produce a predetermined internal pressure for stabilizing the inner bore.

$SF_6$ is preferably used as the etching gas.

$SF_6$ effects a rapid etching off of the quartz glass with formation of volatile compounds of silicon and fluorine and counteracts a diffusion of fluorine out of the cladding glass tube at the same time.

To ensure an adequate thermal loadability of the substrate tube on the one hand and to facilitate the etching-off operation on the other hand, a substrate tube is used that has a wall thickness ranging from 2 mm to 10 mm.

In the preform obtained according to this method, no defects or only a few defects caused by UV radiation are found in the contact surface adjoining the inner cladding glass surface, so that a multimode fiber drawn from said preform has an attenuation of not more than 1 db/m at a wavelength of 214 nm.

The preform produced according to the invention is particularly preferably used for producing fibers for the transmission of UV radiation of a high energy density in the wavelength range between 190 nm and 250 nm. Thanks to its high transmission and its radiation resistance it is particularly well suited for the transmission of high-energy excimer laser UV radiation having wavelengths of 248 nm and 193 nm.

Figure 2:
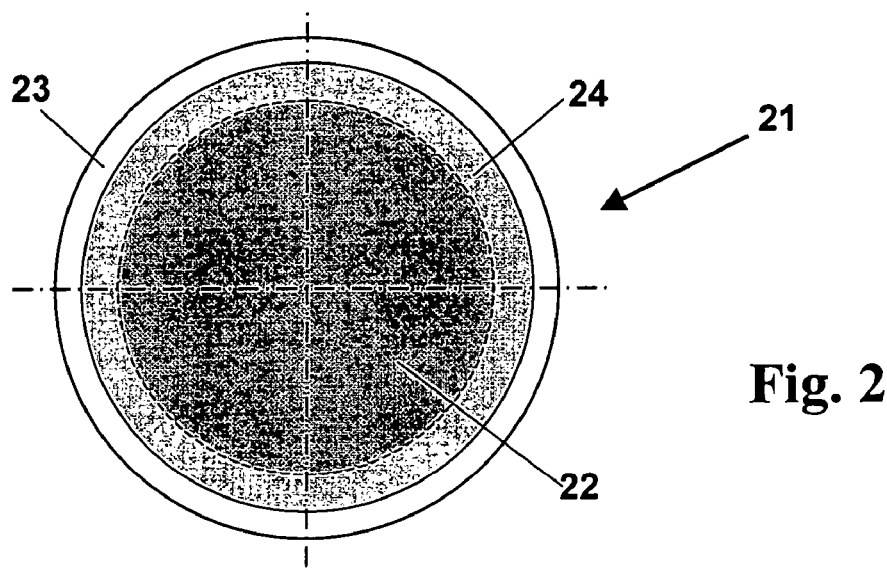
Figure 3:
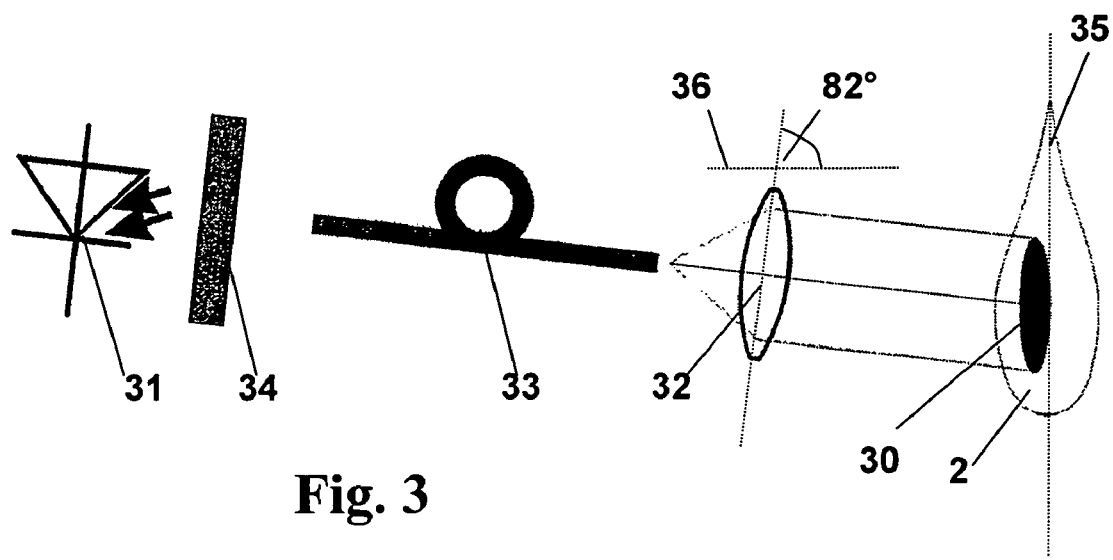
Figure 4:
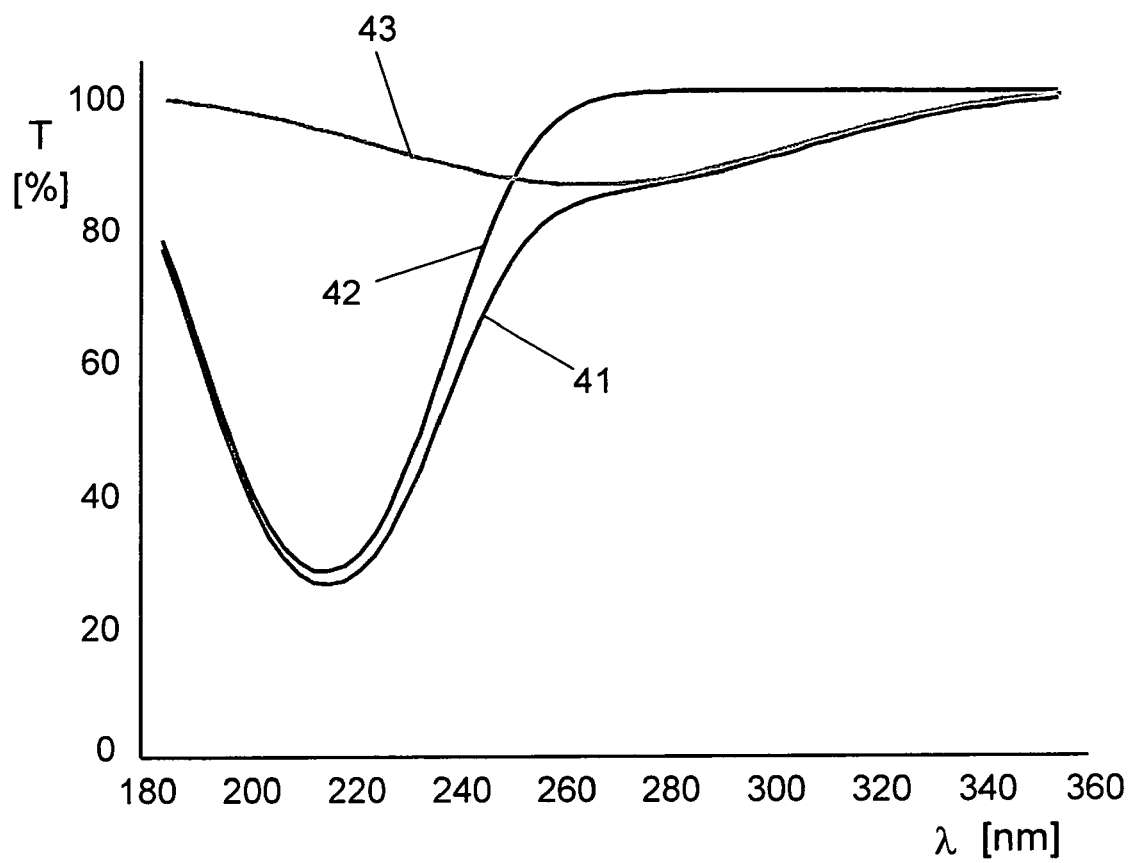
Figure 5:
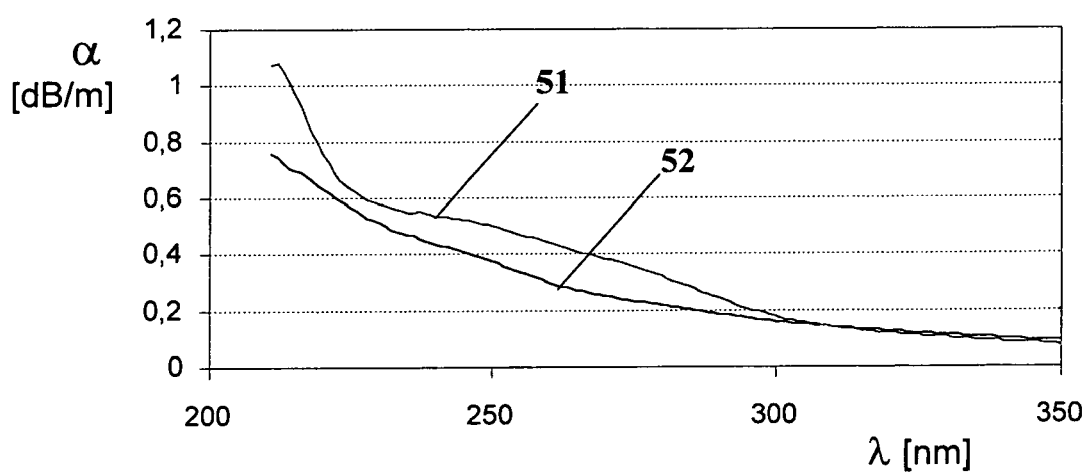

The invention shall now be explained in more detail with reference to embodiments and a patent drawing. The patent drawing shows in detail in FIG. 1 the POD method for producing a preform, in a schematic illustration;

FIG. 2 a radial cross-section through a preform produced according to the method of the invention, in a schematic illustration;

FIG. 3 the measuring set-up used for measuring the intensity of the plasma flame in the UV wavelength range according to the PFI method;

FIG. 4 a diagram for absorbing the damage caused in the core glass cylinder by the UV portion of the plasma flame; and FIG. 5 a diagram for optically attenuating different optical fibers in the wavelength range between 200 nm and 350 nm.

FIG. 1 schematically illustrates the method for producing a preform for so-called multimode fibers with a stepped refractive index profile. To this end a rod 3 of high-purity undoped synthetic quartz glass having a diameter of 86 mm is provided and coated by means of a "plasma outside deposition (POD)" method with a cladding 4 of fluorine-doped quartz glass. To this end $SiCl_4$, oxygen and $SF_6$ are supplied to a plasma burner 1 and converted in a burner flame 2 assigned to the plasma burner 1 into $SiO_2$ particles. The main propagation direction of the plasma flame 2 is illustrated by a dotted line 5. In reversingly moving the plasma burner 1 along the rod 3 from one end to the other end, the $SiO_2$ particles are deposited in layers on the cylindrical outer surface of the rod 3, which is rotating about its longitudinal axis 6. It is thereby possible to incorporate high fluorine concentrations of more than 3% by wt. in the quartz glass network of the cladding 4. The plasma flame 2 is produced inside a reaction sleeve 8 of quartz glass which is surrounded by a high-frequency coil 7. The high-frequency coil 7 has a height of about 92 mm, and the reaction sleeve 8 projects beyond the coil by about 7.5 mm. A distance of 65 mm, which does also not change in the course of the deposition process, is set between the upper end of the high-frequency coil 7 and the surface of the rod 3.

According to the invention the intensity of the plasma is adjusted by supplying a corresponding electrical power in such a manner that the plasma flame 2 emits UV radiation of a wavelength of 214 nm with an intensity of 1.3 µW. As a consequence, defects and precursor defects which cause absorption in the wavelength range between 190 nm and 250 nm and which will be explained in more detail below with reference to FIGS. 4 and 5 are produced in the rod 3, particularly in the near-surface regions of the rod 3.

In the area of the point of impingement of the plasma flame 2 on the surface of the rod 3 or the cladding 4, the surface temperature is continuously measured by means of an IR camera. With an increasing outer diameter of the developing preform, the surface is increasing and the surface temperature is decreasing accordingly. To maintain a constant temperature of 1800° C. in the area of the surface, the intensity of the plasma flame 2 is continuously increased.

The rotational speed of the rod 3 and the translational speed of the plasma burner 1 are adjusted such that the individual cladding glass layers have a mean thickness of about 12 µm. At a draw ratio of preform and fiber this yields a multimode fiber having a core diameter of 200 µm and cladding glass layers having thicknesses of about 0.03 µm, which are clearly below the operating wavelength in the intended use of the fibers and do thus not impair the transmission properties thereof.

FIG. 2 shows the preform obtained according to the method in a radial cross-section. Reference numeral 21 is assigned to the preform for optical fibers on the whole. The preform consists of a core 22 of pure quartz glass which has a refractive index of 1.4571 at 633 nm, and of a cladding 23 of fluorine-doped quartz glass which has a refractive index of 1.440 at a wavelength of 633 nm. The fluorine content of the cladding glass is 5% by wt. The content of hydroxyl groups in core 22 is 700 wt ppm. The core 22 has a diameter of 85 mm, and the cladding 23 has an outer diameter of 93.5 mm. In the area of the contact surface between core 22 and cladding 23, a region which projects into the core 22 is illustrated by dotted lines, said region pointing at a "damage layer" 24 which is very strongly penetrated by structural defects. The defects of the damage layer 24 are produced during the deposition process due to the high UV intensity of the plasma flame 2. The density of said defects decreases inside the damage layer 24 and also inside the core 22 from the outside to the inside, so that it is not possible to indicate an exact thickness.

The measuring method used for measuring the UV intensity of the plasma flame, as well as the measuring set-up, shall now be described with reference to FIG. 3:

In the PFI method used in this instance for determining the plasma flame intensity, part of the flame center of the plasma flame 2 is imaged onto a calibrated photodiode 31. With a $CaF_2$ lens 32, which is spaced from the center of the plasma flame 2 at a distance of 23 cm, an observation point is imaged from the flame center onto a Polymicro UVMI fiber 33 having a length of 50 cm. The front fiber end has a distance of 9.48 cm from the longitudinal axis of the $CaF_2$ lens 32. The light exiting at the other fiber end of the UVMI fiber 33 is guided to the photodiode 31 after having passed through a bandpass filter 34 which has a transmission maximum at a wavelength of about 214 nm. The area of the photodiode 31 is here not completely illuminated. Important parameters of the optical components for said measurement of the UV intensity of the plasma flame are at a wavelength of 214 nm:

$CaF_2$ Lens 32:
Focal length 94.8 mm; transmission 92.4%

UVMI Fiber 33:
Length: 0.5 m; core diameter: 200 µm; transmission 84.3%, NA=0.22

Bandpass Filter 34:
Mid-wavelength: 214 nm; FWHM bandwidth: 10 nm, transmission: 17.3%

Photodiode 31:
Photocurrent/optical power: 0.77 mA/mW

The used UVMI fiber 33 is hydrogen-loaded and shows no photodegradation in the measurement range of the UV radiation. The photodegradation of the remaining components can be neglected.

The diameter D of the observation point results from the numerical aperture (NA) of the fiber 33 and the focal length of the used lens 32 as follows:

$$D=2\cdot\tan(\arcsin(NA))\cdot 9.48 \text{ cm}=4.2 \text{ cm}.$$

The viewing direction is not perpendicular to the vertically extending main propagation direction 35 of the plasma flame 2, but at an angle of about 82° relative thereto, as shown by the angular data on the horizontal 35. The region of maximum intensity at the upper edge of the reaction sleeve 8 (and outside of said sleeve) is chosen as the viewing point inside the plasma flame 2, said sleeve projecting beyond the coil 7 by 5-10 mm. It can be assumed that an even higher UV intensity could be measured inside the reaction sleeve 8, which in practice can however only be determined by taking great efforts. As a result, the measurement yields an integral intensity over a portion of the plasma flame 2 that is illustrated in FIG. 3 as a projection 30 of the measuring spot onto the envelope of the plasma flame 2.

The diagram of FIG. 4 schematically shows, over the wavelength range between 180 nm and 360 nm, the relative transmission (based on the initial transmission) of quartz glass after damage caused by the UV radiation of the plasma flame 2. The defects produced thereby create an absorption curve 41, of which a pronounced absorption band is typical at a wavelength of 214 nm. It could be demonstrated that the absorption band 41 mainly follows from the superimposition of the absorptions of two types of defects. The one type of defect has an absorption curve with a pronounced absorption maximum at a wavelength of 214 nm (caused by so-called E' centers; line 42) and the other type effects a flat absorption curve (caused by so-called NBOH centers; line 43) in the wavelength range of about 265 nm. On the whole, the defects produced in this way subsequently create an absorption of the UV radiation of the plasma flame 2 in the wavelength range between 180 nm and 260 nm and thus a decrease in the UV load on the center of the core glass layer 22 (FIG. 2).

In the diagram of FIG. 5, the attenuation in dB/m as measured on optical fibers is plotted on the y-axis, and the wavelength on the x-axis. The upper one of the two illustrated curves 51 shows the attenuation profile over the wavelength range of 200 nm to 350 nm in the case of an optical fiber produced according to the prior art, with an intensity of the plasma flame of 0.7 µm in the POD process. The curve 52 positioned thereunder shows the attenuation profile in the case of an optical fiber which has been produced from a preform produced according to the method of the invention (with an intensity of the plasma flame of 1.2 µm in the POD process).

It becomes apparent therefrom that the optical attenuation, particularly at short wavelengths in the range between 210 nm and 300 nm, in the optical fiber 52 produced according to the method of the invention is lower than in the fiber 51 produced according to the standard method. The fiber 52 shows a distinctly lower absorption particularly in the wavelength range around 215 nm and 265 nm and is therefore well suited for applications involving the transmission of ultraviolet radiation, particularly the transmission of high-energy UV radiation of a wavelength of 248 nm and 193 nm.

As an alternative to the method explained with reference to FIG. 1, the cladding glass layer is deposited by means of the POD method on a substrate tube of quartz glass. The substrate tube has an outer diameter of 86 mm and a wall thickness of 4 mm.

In the course of the deposition process, an etching gas stream of $SF_6$ is introduced into the bore of the substrate tube. A cladding glass layer having a thickness of about 4.3 mm is produced on the substrate tube, as described with reference to FIG. 1. The etching gas stream of $SF_6$ is dimensioned such that the substrate tube is completely removed directly before completion of the outside deposition process, and it is only the cladding glass tube having a wall thickness of about 4 mm that is obtained.

For producing a preform the cladding glass tube is collapsed onto a core rod having a diameter of 85 mm. The preform is characterized in that despite a cladding produced in the POD method its core glass shows no defects that have been created by UV radiation, e.g. of the plasma flame. A multimode fiber is drawn from the preform with a core diameter of 200 µm. At a wavelength of 214 nm, said fiber shows an initial attenuation of 0.6 dB/m. Moreover, the fiber was subjected to an UV irradiation test in which a fiber having a length of 2 m and a core diameter of 200 μm was irradiated by a deuterium lamp for four hours. The power coupled into the fiber was here 70 nW/nm at the wavelength of 214 nm. Under these conditions an additional attenuation of 4 dB was detected at 214 nm.

The fibers drawn from the preform are characterized by a high transmission for UV radiation in the wavelength range between 190 nm and 250 nm and by a high UV radiation resistance.

The invention claimed is:

1. A method for producing a preform for optical fibers, said method comprising: providing a core glass cylinder having a longitudinal axis, producing a fluorine-doped $SiO_2$ cladding glass on the core glass cylinder rotating about the longitudinal axis thereof, said producing including feeding a plasma burner with a silicon-containing starter substance, said starter substance being oxidized in a plasma flame of the plasma burner so as to obtain $SiO_2$ particles, and depositing the $SiO_2$ particles in layers on a cylindrical outer surface of the core glass cylinder in the presence of fluorine and sintering said $SiO_2$ particles deposited into the cladding glass, wherein said plasma flame emits ultraviolet light in one or more wavelengths of about 214 nm at an intensity of at least 0.9 μW, determined on the basis of a plasma flame intensity measurement, during the forming and depositing of the $SiO_2$ particles on the core glass cylinder.

2. The method according to claim 1, wherein the plasma flame emits said ultraviolet light at an intensity ranging from 1.0 μW to 1.4 μW.

3. The method according to claim 1, wherein the cylindrical outer surface of the core glass cylinder is kept at a surface temperature ranging from 1550° C. to 2000° C. during deposition of the $SiO_2$ particles, and wherein the core glass cylinder has an outer diameter of at least 40 mm.

4. The method according to claim 3, wherein the cylindrical outer surface of the core glass cylinder is kept at a surface temperature ranging from 1700° C. to 1900° C. during deposition of the $SiO_2$ particles, and wherein the core glass cylinder has an outer diameter of at least 60 mm.

5. The method according to claim 1, wherein the $SiO_2$ particles are deposited on the cylindrical outer surface in layers having a layer thickness such that optical fibers derived from the preform have optical fiber layers yielded by the layers of the deposited $SiO_2$ particles, and said optical fiber layers have respective layer thicknesses of not more than 0.05 μm in the optical fibers.

6. A method for producing a preform for optical fibers, said method comprising:

providing a core glass cylinder having a longitudinal axis; and producing a fluorine-doped $SiO_2$ cladding glass on the core glass cylinder rotating about the longitudinal axis thereof;

said producing including feeding a plasma burner with a silicon-containing starter substance, said starter substance being oxidized in a plasma flame of the plasma burner so as to obtain $SiO_2$ particles; and depositing the $SiO_2$ particles in layers on a cylindrical outer surface of the core glass cylinder in the presence of fluorine; and sintering said $SiO_2$ particles deposited into the cladding glass;

wherein, during the forming and depositing of the $SiO_2$ particles on the core glass cylinder, said plasma flame emits UV radiation having a wavelength of 214 nm at an intensity such that the UV radiation of the cylindrical outer surface of the core glass cylinder produces a damage layer in an area of contact between the core glass cylinder and the layers of $SiO_2$ particles applied to the cylindrical outer surface, said damage layer blocking the passage of the UV radiation therethrough so that the core glass cylinder is shielded thereby from damaging effects of further UV radiation as the $SiO_2$ particles are formed in the plasma flame and deposited.

7. The method according to claim 6, wherein said UV radiation has an intensity of at least 0.9 μW, determined on the basis of a plasma flame intensity measurement, during the forming and depositing of the $SiO_2$ particles on the core glass cylinder.

8. The method according to claim 6, wherein said UV radiation has an intensity ranging from 1.0 μW to 1.4 μW, determined on the basis of a plasma flame intensity measurement, during the forming and depositing of the $SiO_2$ particles on the core glass cylinder.

9. The method according to claim 6, wherein the cylindrical outer surface of the core glass cylinder is kept at a surface temperature ranging from 1550° C. to 2000° C. during deposition of the $SiO_2$ particles, and wherein the core glass cylinder has an outer diameter of at least 40 mm.

10. The method according to claim 6, wherein the cylindrical outer surface of the core glass cylinder is kept at a surface temperature ranging from 1700° C. to 1900° C. during deposition of the $SiO_2$ particles, and wherein the core glass cylinder has an outer diameter of at least 60 mm.

11. The method according to claim 6, wherein the $SiO_2$ particles are deposited on the cylindrical outer surface in layers having a layer thickness such that optical fibers derived from the preform have optical fiber layers yielded by the layers of the deposited $SiO_2$ particles, and said optical fiber layers have respective layer thicknesses of not more than 0.05 μm in the optical fibers.

* * * * *